(12) United States Patent
Shatz et al.

(10) Patent No.: US 8,033,690 B1
(45) Date of Patent: Oct. 11, 2011

(54) LIGHT ASSEMBLY FOR FLASHLIGHTS

(75) Inventors: Narkis E. Shatz, San Diego, CA (US); John C. Bortz, Spokane, WA (US)

(73) Assignee: Surefire, LLC, Fountain Valley, CA (US)

( * ) Notice: Subject to any disclaimer, the term of this patent is extended or adjusted under 35 U.S.C. 154(b) by 251 days.

(21) Appl. No.: 12/290,930

(22) Filed: Nov. 5, 2008

Related U.S. Application Data (63) Continuation-in-part of application No. 12/004,664, filed on Dec. 20, 2007.

(60) Provisional application No. 61/003,794, filed on Nov. 19, 2007, provisional application No. 60/879,948, filed on Jan. 9, 2007.

(51) Int. Cl.
*F21V 7/00* (2006.01)

(52) U.S. Cl. .............. 362/309; 362/555; 362/311.02; 362/326; 362/184

(58) Field of Classification Search .......... 362/555, 362/551, 29, 30, 308, 309, 311.02, 317, 296.1, 362/326, 184
See application file for complete search history.

(56) References Cited

U.S. PATENT DOCUMENTS

| | | | |
|---|---|---|---|
| 4,770,514 A | 9/1988 | Silverglate | |
| 5,485,317 A | 1/1996 | Perissinotto et al. | |
| 5,577,493 A | 11/1996 | Parkyn, Jr. et al. | |
| 5,757,557 A | 5/1998 | Medvedev et al. | |
| 5,813,743 A | 9/1998 | Naka | |
| 5,926,658 A | 7/1999 | Tenmyo | |
| 6,078,752 A | 6/2000 | Tenmyo | |
| 6,400,905 B1 | 6/2002 | Tenmyo | |
| 6,478,453 B2 | 11/2002 | Lammers et al. | |
| 6,547,423 B2 | 4/2003 | Marshall et al. | |
| 6,575,582 B2 | 6/2003 | Tenmyo | |
| 6,632,004 B2 | 10/2003 | Sugawara et al. | |
| 6,807,369 B1 | 10/2004 | Tenmyo | |
| 6,819,506 B1 | 11/2004 | Taylor et al. | |
| 7,246,931 B2 | 7/2007 | Hsieh et al. | |
| 7,361,940 B2 | 4/2008 | Kim et al. | |

(Continued)

FOREIGN PATENT DOCUMENTS

JP 4138439 5/1992

(Continued)

OTHER PUBLICATIONS

N. Shatz and J. Bortz, "An inverse engineering perspective on nonimaging optical design," Proc. SPIE, v. 2358, pp. 136-156 (1995).
N. Shatz, J. Bortz and D. Pitou, "Optimal design of a nonimaging projection lens for use with an LED source and a rectangular target," Proc. SPIE, v. 4092, pp. 130-138 (2000).
N. Shatz and J. Bortz, "Optimal design of a nonimaging lens for use with an RF source and a rectangular target," Proc. SPIE, v. 4446, pp. 171-184 (2001).

(Continued)

*Primary Examiner* — Stephen F Husar
(74) *Attorney, Agent, or Firm* — David Weiss (57) ABSTRACT

A nonimaging light assembly for flashlights, including a light source and a lens symmetrical about an optical axis for receiving light from the light source and producing therefrom a light beam having concentrated and divergent components resulting in a high intensity core beam surrounded by a smoothly transitioning lower intensity surround beam. In a preferred embodiment utilizing a light emitting diode as the light source, the combined light beam produced by the light assembly has a substantially circular cross section. In a preferred embodiment including a hybrid LED light source having a white-light die and an infrared die, a lens optimized with the white-light die produces a satisfactory IR beam having concentrated and divergent components when used with the IR die.

23 Claims, 11 Drawing Sheets

U.S. PATENT DOCUMENTS

| | | |
|---|---|---|
| 2004/0105171 A1 | 6/2004 | Minano et al. |
| 2005/0122711 A1 | 6/2005 | Matthews et al. |
| 2005/0201100 A1 | 9/2005 | Cassarly et al. |
| 2007/0063321 A1 | 3/2007 | Han et al. |

FOREIGN PATENT DOCUMENTS

| | | |
|---|---|---|
| JP | 8262538 | 10/1996 |
| WO | WO2006072885 A1 | 7/2006 |

OTHER PUBLICATIONS

H. Ries, N. Shatz, J. Bortz, and W. Spirkl, "Consequences of skewness conservation for rotationally symmetric nonimaging devices," Proc. SPIE, v. 3139, pp. 47-58 (1997).

N. Shatz, J. Bortz, H. Ries, and R. Winston, "Nonrotationally symmetric nonimaging systems that overcome the flux-transfer performance limit imposed by skewness conservation," Proc. SPIE, v. 3139, pp. 76-85 (1997).

| X | Y | X | Y | X | Y |
|---|---|---|---|---|---|
| -10.6626 | 0.0000 | -13.4676 | 2.7961 | -10.1888 | 6.3764 |
| -10.6626 | 0.1000 | -13.5649 | 2.8192 | -10.1020 | 6.4262 |
| -10.6626 | 0.2000 | -13.6623 | 2.8421 | -10.0152 | 6.4757 |
| -10.6626 | 0.3000 | -13.7596 | 2.8650 | -9.9282 | 6.5250 |
| -10.6626 | 0.4000 | -13.8181 | 2.8786 | -9.8410 | 6.5741 |
| -10.6626 | 0.5000 | -13.8181 | 3.8658 | -9.7537 | 6.6229 |
| -10.6626 | 0.6000 | -13.8030 | 3.8789 | -9.6663 | 6.6715 |
| -10.6626 | 0.7000 | -13.7276 | 3.9446 | -9.5788 | 6.7198 |
| -10.6626 | 0.8000 | -13.6517 | 4.0097 | -9.4911 | 6.7680 |
| -10.6626 | 0.9000 | -13.5753 | 4.0742 | -9.4034 | 6.8159 |
| -10.6626 | 1.0000 | -13.4984 | 4.1382 | -9.3155 | 6.8635 |
| -10.6626 | 1.1000 | -13.4212 | 4.2017 | -9.2274 | 6.9110 |
| -10.6626 | 1.2000 | -13.3435 | 4.2646 | -9.1393 | 6.9582 |
| -10.6626 | 1.3000 | -13.2654 | 4.3271 | -9.0510 | 7.0053 |
| -10.6626 | 1.4000 | -13.1869 | 4.3891 | -8.9627 | 7.0521 |
| -10.6626 | 1.5000 | -13.1081 | 4.4507 | -8.8742 | 7.0987 |
| -10.6626 | 1.6000 | -13.0289 | 4.5118 | -8.7856 | 7.1451 |
| -10.6626 | 1.7000 | -12.9494 | 4.5724 | -8.6969 | 7.1912 |
| -10.6626 | 1.8000 | -12.8696 | 4.6326 | -8.6081 | 7.2372 |
| -10.6626 | 1.9000 | -12.7894 | 4.6924 | -8.5192 | 7.2830 |
| -10.6626 | 1.9979 | -12.7090 | 4.7518 | -8.4302 | 7.3286 |
| -10.6821 | 2.0024 | -12.6282 | 4.8108 | -8.3411 | 7.3740 |
| -10.7792 | 2.0263 | -12.5472 | 4.8693 | -8.2519 | 7.4192 |
| -10.8758 | 2.0520 | -12.4659 | 4.9275 | -8.1626 | 7.4643 |
| -10.9720 | 2.0794 | -12.3843 | 4.9854 | -8.0732 | 7.5091 |
| -11.0676 | 2.1087 | -12.3024 | 5.0428 | -7.9838 | 7.5538 |
| -11.1626 | 2.1401 | -12.2203 | 5.0999 | -7.8942 | 7.5982 |
| -11.2568 | 2.1735 | -12.1380 | 5.1566 | -7.8046 | 7.6426 |
| -11.3504 | 2.2088 | -12.0554 | 5.2130 | -7.7148 | 7.6867 |
| -11.4435 | 2.2452 | -11.9726 | 5.2691 | -7.6250 | 7.7307 |
| -11.5367 | 2.2816 | -11.8895 | 5.3248 | -7.5351 | 7.7745 |
| -11.6302 | 2.3169 | -11.8062 | 5.3801 | -7.4451 | 7.8181 |
| -11.7245 | 2.3503 | -11.7228 | 5.4352 | -7.3551 | 7.8616 |
| -11.8195 | 2.3815 | -11.6391 | 5.4899 | -7.2650 | 7.9049 |
| -11.9152 | 2.4104 | -11.5552 | 5.5444 | -7.1747 | 7.9481 |
| -12.0116 | 2.4371 | -11.4711 | 5.5985 | -7.0845 | 7.9911 |
| -12.1085 | 2.4617 | -11.3868 | 5.6523 | -6.9941 | 8.0339 |
| -12.2059 | 2.4842 | -11.3023 | 5.7058 | -6.9037 | 8.0766 |
| -12.3037 | 2.5054 | -11.2177 | 5.7591 | -6.8132 | 8.1192 |
| -12.4015 | 2.5261 | -11.1328 | 5.8120 | -6.7227 | 8.1616 |
| -12.4993 | 2.5470 | -11.0478 | 5.8647 | -6.6320 | 8.2039 |
| -12.5968 | 2.5692 | -10.9626 | 5.9170 | -6.5413 | 8.2460 |
| -12.6939 | 2.5931 | -10.8773 | 5.9691 | -6.4506 | 8.2881 |
| -12.7906 | 2.6187 | -10.7918 | 6.0210 | -6.3598 | 8.3299 |
| -12.8870 | 2.6451 | -10.7061 | 6.0725 | -6.2689 | 8.3717 |
| -12.9834 | 2.6719 | -10.6202 | 6.1238 | -6.1780 | 8.4134 |
| -13.0798 | 2.6983 | -10.5343 | 6.1749 | -6.0870 | 8.4549 |
| -13.1765 | 2.7239 | -10.4481 | 6.2256 | -5.9960 | 8.4963 |
| -13.2734 | 2.7487 | -10.3618 | 6.2761 | -5.9050 | 8.5376 |
| -13.3704 | 2.7726 | -10.2754 | 6.3264 | -5.8138 | 8.5788 |

FIG. 8a

| X | Y | X | Y | X | Y |
|---|---|---|---|---|---|
| -5.7227 | 8.6199 | 0.0000 | 8.6000 | 0.0000 | 3.5000 |
| -5.6315 | 8.6609 | 0.0000 | 8.5000 | 0.0000 | 3.4000 |
| -5.5402 | 8.7018 | 0.0000 | 8.4000 | 0.0000 | 3.3000 |
| -5.4489 | 8.7426 | 0.0000 | 8.3000 | 0.0000 | 3.2000 |
| -5.3576 | 8.7833 | 0.0000 | 8.2000 | 0.0000 | 3.1000 |
| -5.2662 | 8.8240 | 0.0000 | 8.1000 | 0.0000 | 3.0000 |
| -5.1748 | 8.8645 | 0.0000 | 8.0000 | 0.0000 | 2.9000 |
| -5.0834 | 8.9050 | 0.0000 | 7.9000 | 0.0000 | 2.8000 |
| -4.9919 | 8.9454 | 0.0000 | 7.8000 | 0.0000 | 2.7000 |
| -4.9004 | 8.9857 | 0.0000 | 7.7000 | 0.0000 | 2.6000 |
| -4.8088 | 9.0260 | 0.0000 | 7.6000 | 0.0000 | 2.5000 |
| -4.7173 | 9.0662 | 0.0000 | 7.5000 | 0.0000 | 2.4000 |
| -4.6257 | 9.1063 | 0.0000 | 7.4000 | 0.0000 | 2.3000 |
| -4.5341 | 9.1464 | 0.0000 | 7.3000 | 0.0000 | 2.2000 |
| -4.4424 | 9.1863 | 0.0000 | 7.2000 | 0.0000 | 2.1000 |
| -4.3507 | 9.2262 | 0.0000 | 7.1000 | 0.0000 | 2.0000 |
| -4.2590 | 9.2661 | 0.0000 | 7.0000 | 0.0000 | 1.9000 |
| -4.1672 | 9.3058 | 0.0000 | 6.9000 | 0.0000 | 1.8000 |
| -4.0754 | 9.3454 | 0.0000 | 6.8000 | 0.0000 | 1.7000 |
| -3.9835 | 9.3849 | 0.0000 | 6.7000 | 0.0000 | 1.6000 |
| -3.8916 | 9.4243 | 0.0000 | 6.6000 | 0.0000 | 1.5000 |
| -3.7997 | 9.4637 | 0.0000 | 6.5000 | 0.0000 | 1.4000 |
| -3.7077 | 9.5028 | 0.0000 | 6.4000 | 0.0000 | 1.3000 |
| -3.6156 | 9.5419 | 0.0000 | 6.3000 | 0.0000 | 1.2000 |
| -3.5235 | 9.5809 | 0.0000 | 6.2000 | 0.0000 | 1.1000 |
| -3.4314 | 9.6197 | 0.0000 | 6.1000 | 0.0000 | 1.0000 |
| -3.3392 | 9.6584 | 0.0000 | 6.0000 | 0.0000 | 0.9000 |
| -3.2469 | 9.6970 | 0.0000 | 5.9000 | 0.0000 | 0.8000 |
| -3.1546 | 9.7354 | 0.0000 | 5.8000 | 0.0000 | 0.7000 |
| -3.0622 | 9.7737 | 0.0000 | 5.7000 | 0.0000 | 0.6000 |
| -2.9698 | 9.8119 | 0.0000 | 5.6000 | 0.0000 | 0.5000 |
| -2.8773 | 9.8499 | 0.0000 | 5.5000 | 0.0000 | 0.4000 |
| -2.7847 | 9.8877 | 0.0000 | 5.4000 | 0.0000 | 0.3000 |
| -2.6919 | 9.9250 | 0.0000 | 5.3000 | 0.0000 | 0.2000 |
| -2.5989 | 9.9618 | 0.0000 | 5.2000 | 0.0000 | 0.1000 |
| -2.5057 | 9.9979 | 0.0000 | 5.1000 | 0.0000 | 0.0000 |
| -2.4870 | 10.0049 | 0.0000 | 5.0000 | | |
| 0.0000 | 10.0000 | 0.0000 | 4.9000 | | |
| 0.0000 | 9.9000 | 0.0000 | 4.8000 | | |
| 0.0000 | 9.8000 | 0.0000 | 4.7000 | | |
| 0.0000 | 9.7000 | 0.0000 | 4.6000 | | |
| 0.0000 | 9.6000 | 0.0000 | 4.5000 | | |
| 0.0000 | 9.5000 | 0.0000 | 4.4000 | | |
| 0.0000 | 9.4000 | 0.0000 | 4.3000 | | |
| 0.0000 | 9.3000 | 0.0000 | 4.2000 | | |
| 0.0000 | 9.2000 | 0.0000 | 4.1000 | | |
| 0.0000 | 9.1000 | 0.0000 | 4.0000 | | |
| 0.0000 | 9.0000 | 0.0000 | 3.9000 | | |
| 0.0000 | 8.9000 | 0.0000 | 3.8000 | | |
| 0.0000 | 8.8000 | 0.0000 | 3.7000 | | |
| 0.0000 | 8.7000 | 0.0000 | 3.6000 | | |

FIG. 8b

| X | Y | SLOPE |
|---|---|---|
| -10.6626 | 1.9979 | 167.1114 |
| -10.6821 | 2.0024 | 166.8215 |
| -10.7792 | 2.0263 | 165.6051 |
| -10.8758 | 2.0520 | 164.5988 |
| -10.9720 | 2.0794 | 163.5194 |
| -11.0676 | 2.1087 | 162.3647 |
| -11.1626 | 2.1401 | 161.1321 |
| -11.2568 | 2.1735 | 159.8326 |
| -11.3504 | 2.2088 | 158.8851 |
| -11.4435 | 2.2452 | 158.5513 |
| -11.5367 | 2.2816 | 158.8641 |
| -11.6302 | 2.3169 | 159.8091 |
| -11.7245 | 2.3503 | 161.1846 |
| -11.8195 | 2.3815 | 162.5385 |
| -11.9152 | 2.4104 | 163.8524 |
| -12.0116 | 2.4371 | 165.1378 |
| -12.1085 | 2.4617 | 166.4055 |
| -12.2059 | 2.4842 | 167.4585 |
| -12.3037 | 2.5054 | 168.0067 |
| -12.4015 | 2.5261 | 168.0615 |
| -12.4993 | 2.5470 | 167.6295 |
| -12.5968 | 2.5692 | 166.7084 |
| -12.6939 | 2.5931 | 165.6145 |
| -12.7906 | 2.6187 | 164.8794 |
| -12.8870 | 2.6451 | 164.5141 |
| -12.9834 | 2.6719 | 164.5122 |
| -13.0798 | 2.6983 | 164.8606 |
| -13.1765 | 2.7239 | 165.4400 |
| -13.2734 | 2.7487 | 165.9252 |
| -13.3704 | 2.7726 | 166.2948 |
| -13.4676 | 2.7961 | 166.5547 |
| -13.5649 | 2.8192 | 166.7122 |
| -13.6623 | 2.8421 | 166.7756 |
| -13.7596 | 2.8650 | 166.8242 |
| -13.8181 | 2.8786 | 166.8914 |

FIG. 9

| X | Y | SLOPE | X | Y | SLOPE | X | Y | SLOPE |
|---|---|---|---|---|---|---|---|---|
| -13.8181 | 3.8658 | 41.3390 | -10.1020 | 6.4262 | 29.7703 | -5.9960 | 8.4963 | 24.4310 |
| -13.8030 | 3.8789 | 41.2496 | -10.0152 | 6.4757 | 29.6108 | -5.9050 | 8.5376 | 24.3635 |
| -13.7276 | 3.9446 | 40.8127 | -9.9282 | 6.5250 | 29.4534 | -5.8138 | 8.5788 | 24.2983 |
| -13.6517 | 4.0097 | 40.3916 | -9.8410 | 6.5741 | 29.2978 | -5.7227 | 8.6199 | 24.2353 |
| -13.5753 | 4.0742 | 39.9854 | -9.7537 | 6.6229 | 29.1441 | -5.6315 | 8.6609 | 24.1744 |
| -13.4984 | 4.1382 | 39.5931 | -9.6663 | 6.6715 | 28.9922 | -5.5402 | 8.7018 | 24.1156 |
| -13.4212 | 4.2017 | 39.2140 | -9.5788 | 6.7198 | 28.8420 | -5.4489 | 8.7426 | 24.0589 |
| -13.3435 | 4.2646 | 38.8472 | -9.4911 | 6.7680 | 28.6935 | -5.3576 | 8.7833 | 24.0043 |
| -13.2654 | 4.3271 | 38.4920 | -9.4034 | 6.8159 | 28.5465 | -5.2662 | 8.8240 | 23.9517 |
| -13.1869 | 4.3891 | 38.1478 | -9.3155 | 6.8635 | 28.4013 | -5.1748 | 8.8645 | 23.9011 |
| -13.1081 | 4.4507 | 37.8140 | -9.2274 | 6.9110 | 28.2580 | -5.0834 | 8.9050 | 23.8525 |
| -13.0289 | 4.5118 | 37.4899 | -9.1393 | 6.9582 | 28.1169 | -4.9919 | 8.9454 | 23.8057 |
| -12.9494 | 4.5724 | 37.1750 | -9.0510 | 7.0053 | 27.9779 | -4.9004 | 8.9857 | 23.7609 |
| -12.8696 | 4.6326 | 36.8690 | -8.9627 | 7.0521 | 27.8411 | -4.8088 | 9.0260 | 23.7185 |
| -12.7894 | 4.6924 | 36.5713 | -8.8742 | 7.0987 | 27.7063 | -4.7173 | 9.0662 | 23.6771 |
| -12.7090 | 4.7518 | 36.2814 | -8.7856 | 7.1451 | 27.5737 | -4.6257 | 9.1063 | 23.6347 |
| -12.6282 | 4.8108 | 35.9990 | -8.6969 | 7.1912 | 27.4431 | -4.5341 | 9.1464 | 23.5894 |
| -12.5472 | 4.8693 | 35.7238 | -8.6081 | 7.2372 | 27.3146 | -4.4424 | 9.1863 | 23.5403 |
| -12.4659 | 4.9275 | 35.4553 | -8.5192 | 7.2830 | 27.1881 | -4.3507 | 9.2262 | 23.4880 |
| -12.3843 | 4.9854 | 35.1933 | -8.4302 | 7.3286 | 27.0636 | -4.2590 | 9.2661 | 23.4325 |
| -12.3024 | 5.0428 | 34.9375 | -8.3411 | 7.3740 | 26.9411 | -4.1672 | 9.3058 | 23.3739 |
| -12.2203 | 5.0999 | 34.6875 | -8.2519 | 7.4192 | 26.8206 | -4.0754 | 9.3454 | 23.3123 |
| -12.1380 | 5.1566 | 34.4431 | -8.1626 | 7.4643 | 26.7020 | -3.9835 | 9.3849 | 23.2479 |
| -12.0554 | 5.2130 | 34.2041 | -8.0732 | 7.5091 | 26.5854 | -3.8916 | 9.4243 | 23.1808 |
| -11.9726 | 5.2691 | 33.9702 | -7.9838 | 7.5538 | 26.4706 | -3.7997 | 9.4637 | 23.1109 |
| -11.8895 | 5.3248 | 33.7411 | -7.8942 | 7.5982 | 26.3578 | -3.7077 | 9.5028 | 23.0387 |
| -11.8062 | 5.3801 | 33.5168 | -7.8046 | 7.6426 | 26.2469 | -3.6156 | 9.5419 | 22.9641 |
| -11.7228 | 5.4352 | 33.2969 | -7.7148 | 7.6867 | 26.1378 | -3.5235 | 9.5809 | 22.8870 |
| -11.6391 | 5.4899 | 33.0814 | -7.6250 | 7.7307 | 26.0306 | -3.4314 | 9.6197 | 22.8079 |
| -11.5552 | 5.5444 | 32.8699 | -7.5351 | 7.7745 | 25.9251 | -3.3392 | 9.6584 | 22.7277 |
| -11.4711 | 5.5985 | 32.6624 | -7.4451 | 7.8181 | 25.8215 | -3.2469 | 9.6970 | 22.6449 |
| -11.3868 | 5.6523 | 32.4587 | -7.3551 | 7.8616 | 25.7197 | -3.1546 | 9.7354 | 22.5571 |
| -11.3023 | 5.7058 | 32.2586 | -7.2650 | 7.9049 | 25.6196 | -3.0622 | 9.7737 | 22.4733 |
| -11.2177 | 5.7591 | 32.0621 | -7.1747 | 7.9481 | 25.5213 | -2.9698 | 9.8119 | 22.3985 |
| -11.1328 | 5.8120 | 31.8688 | -7.0845 | 7.9911 | 25.4247 | -2.8773 | 9.8499 | 22.2815 |
| -11.0478 | 5.8647 | 31.6788 | -6.9941 | 8.0339 | 25.3299 | -2.7847 | 9.8877 | 22.0957 |
| -10.9626 | 5.9170 | 31.4920 | -6.9037 | 8.0766 | 25.2367 | -2.6919 | 9.9250 | 21.7945 |
| -10.8773 | 5.9691 | 31.3080 | -6.8132 | 8.1192 | 25.1451 | -2.5989 | 9.9618 | 21.3680 |
| -10.7918 | 6.0210 | 31.1270 | -6.7227 | 8.1616 | 25.0558 | -2.5057 | 9.9979 | 20.8290 |
| -10.7061 | 6.0725 | 30.9487 | -6.6320 | 8.2039 | 24.9689 | -2.4120 | 10.0329 | 20.1788 |
| -10.6202 | 6.1238 | 30.7732 | -6.5413 | 8.2460 | 24.8846 | -2.4870 | 10.0049 | 20.7079 |
| -10.5343 | 6.1749 | 30.6001 | -6.4506 | 8.2881 | 24.8030 | | | |
| -10.4481 | 6.2256 | 30.4296 | -6.3598 | 8.3299 | 24.7238 | | | |
| -10.3618 | 6.2761 | 30.2614 | -6.2689 | 8.3717 | 24.6470 | | | |
| -10.2754 | 6.3264 | 30.0955 | -6.1780 | 8.4134 | 24.5727 | | | |
| -10.1888 | 6.3764 | 29.9318 | -6.0870 | 8.4549 | 24.5007 | | | |

LIGHT ASSEMBLY FOR FLASHLIGHTS

CROSS-REFERENCE TO RELATED APPLICATIONS

This invention claims the benefit of U.S. Provisional Application No. 61/003,794 filed Nov. 19, 2007, incorporated in full herein by reference; and this application is a continuation-in-part of U.S. patent application Ser. No. 12/004,664 filed Dec. 20, 2007, incorporated in full herein by reference, which claims the benefit of U.S. Provisional Application No. 60/879,948 filed Jan. 9, 2007, incorporated in full herein by reference.

BACKGROUND OF THE INVENTION

This invention relates to nonimaging light assemblies, and more particularly to such light assemblies for use in flashlights.

Nonimaging light assemblies for flashlights are well known in the art, as are total-internal reflection lenses for collimating the light rays from a light source, such as a light emitting diode, to produce a concentrated light beam for illuminating objects and surroundings. Although such light assemblies of the prior art have been the subject of significant development in recent years, there nevertheless remains a need for light assemblies having improved beam characteristics for utilization in flashlights and compact flashlights in particular.

SUMMARY OF THE INVENTION

According to one aspect of the present invention, there is provided a nonimaging light assembly for flashlights, for generating a light beam having concentrated and divergent components resulting in a high intensity core beam surrounded by a smoothly transitioning lower intensity surround beam. According to another aspect of the present invention, the light source of the nonimaging light assembly may include a light emitting diode of approximately square configuration whereas the combined output light beam produced by the assembly has a substantially circular cross-section.

In its preferred embodiment, the nonimaging light assembly according to the present invention includes a light source and a lens symmetrical about an optical axis for receiving light from the light source and producing therefrom a light beam having a first light component diverging from the optical axis combined with a concentrated second light component. The preferred lens embodiment includes a central refractive first rear surface intersecting the optical axis for receiving a first portion of the light emanating from the light source positioned along the optical axis, an aspheric refractive second rear surface extending about the first rear surface for receiving a second portion of the light emanating from the light source, an aspheric total-internal reflection (TIR) side surface for total-internally reflecting and concentrating light received by the second rear surface, and a refractive front surface for exiting light reflected from the TIR side surface and light received by the first rear surface. The diameter of the first rear surface (which is preferably configured as a flat circle orthogonal to the optical axis), the axisymmetric profile of the second rear surface, and the axisymmetric profile of the TIR side surface are related for exiting at the front surface (which is preferably configured as a flat circle orthogonal to the optical axis) the light beam comprising the concentrated light component combined with the divergent light component.

The light source preferably includes a light emitting diode (LED), typically of approximately square configuration substantially perpendicular to the optical axis, and the combined light beam produced by the lens of the preferred embodiment has a substantially circular cross-section.

In a preferred embodiment wherein the light source includes a hybrid LED source having a white-light die and an infrared (IR) die, the lens optimized according to the present invention with the white-light die produces a satisfactory IR beam having concentrated and divergent components when used with the IR die.

BRIEF DESCRIPTION OF THE DRAWINGS

The novel features believed to be characteristic of the present invention, together with further advantages thereof, will be better understood from the following description considered in connection with the accompanying drawings (including plots and tables) in which a preferred embodiment of the invention is illustrated by way of example.

FIGS. 8a and 8b comprise a list of sample points on the lens profile shown in FIG. 2;

FIG. 10 comprises a list of sample points describing the aspheric total-internal reflective side surface of the lens shown in FIG. 2;

DETAILED DESCRIPTION OF THE PREFERRED EMBODIMENT

Figure 1:
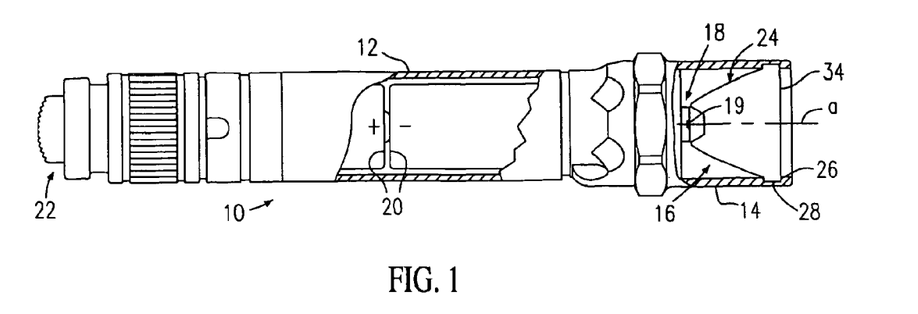
FIG. 1 is a partially cut-away side elevation view of a flashlight including a preferred embodiment of a nonimaging light assembly according to the present invention.

Turning to FIG. 1, there is shown an example of a flashlight 10 including a generally cylindrical battery housing 12, a head 14 at the flashlight's front end including a light assembly 16 with a light source 18 in electrical circuit with a battery comprising at least one battery cell 20, and a switch 22 in circuit and actuable by a user for causing the battery 20 to energize the light source 18.

The light assembly 16 includes a total-internal reflection (TIR) lens 24 according to a preferred embodiment of the present invention. The lens 24 is rotationally symmetrical about its optical axis a, and is combined with the light source 18 including a light emitting diode (LED) 19 situated at the rear of the lens 24 along the optical axis a. The shape and material properties of the lens 24 are such that the lens 24 collects light from the LED source 18 and produces therefrom a light beam comprising an axisymmetrical first light component diverging from the optical axis combined with an axisymmetrical concentrated second light component. In the preferred lens configuration, the light of the combined beam smoothly transitions from the concentrated component to the divergent component as the divergent component surrounds the concentrated component.

The lens 24 is secured to the flashlight head 14, for example by means of an annular flange mount 26 about the front edge of the lens 24 affixed within a groove arrangement 28 of the head 14. The flange mount 26 radially extends from a flange section 27 (FIG. 2) immediately rearwardly of the lens front surface 34.

The LED 19 of the light source 18 is secured in a fixed position with respect to the lens 24. For example, a circuit board containing the LED die 19 may be secured to a further circuit board 32 fixed to the flashlight head 14 (or to the housing 12), the circuit board 32 containing flashlight circuitry which may include a controller for controlling operation of the LED 19 in combination with the switch 22 and battery 20.

Figure 2:
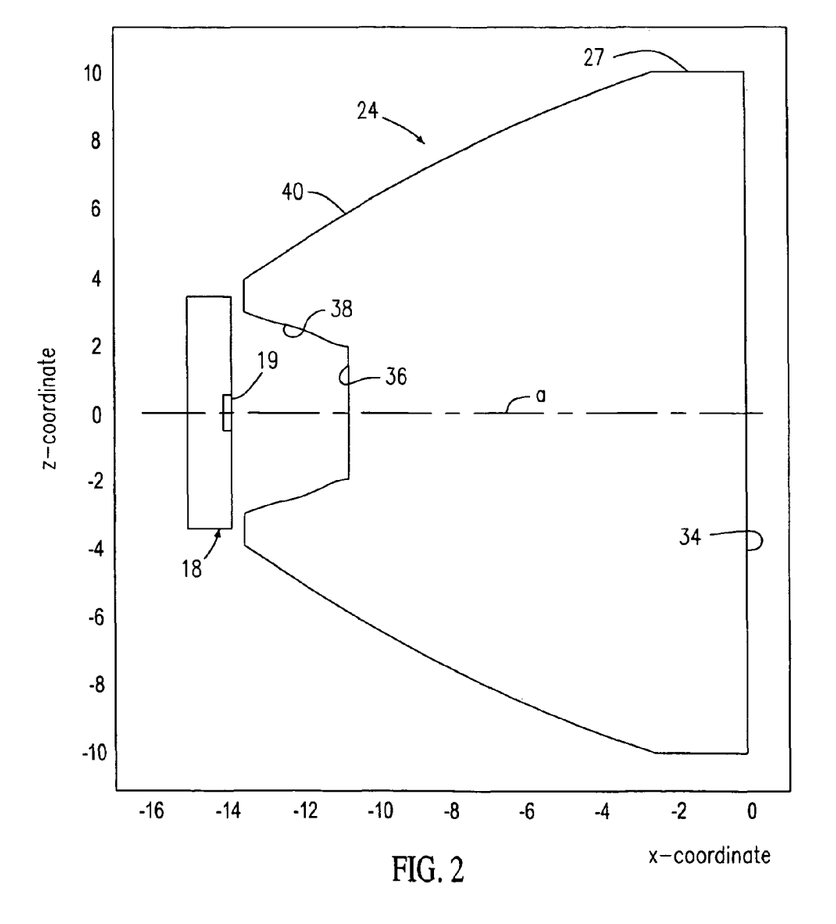
FIG. 2 shows the profile (in the x,z-plane) of a preferred lens embodiment included in the light assembly of FIG. 1, shown in operational relation to the light emitting diode (LED) light source of the light assembly.

The axisymmetric profile of the preferred embodiment of the lens 24, in the x,z-plane, is shown in FIG. 2 in greatly increased scale, with the x-coordinate corresponding to the symmetry axis of the lens 24 along its optical axis a and originating at the lens front surface 34, and with the z-axis representing radial distance from the optical axis. In the preferred lens embodiment, the x-coordinate and the z-coordinate are dimensioned in millimeters.

In addition to the front surface 34, the lens 24 includes a refractive first rear surface 36, preferably flat and orthogonally intersecting and symmetrical about the optical axis a, for receiving a first portion of the light emanating from the LED source 18 positioned along the optical axis a. An axisymmetric aspheric refractive second rear surface 38 of the lens 24 symmetrically extends about the first rear surface 36 for receiving a second portion of the light emanating from the LED light source 18. A total-internal reflection (TIR) side surface 40 of the lens 24 extends symmetrically about the optical axis a for total-internally reflecting and concentrating light received by the second rear surface. The diameter of the first rear surface 36, the axisymmetric profile of the second rear surface 38, and the axisymmetric profile of the TIR side surface 40 are related to one another for exiting at the front surface 34 the light beam comprising the first light component diverging from the optical axis combined with the concentrated second light component.

The preferred lens embodiment 24 was designed using the inverse engineering approach described by the present inventors John Bortz and Narkis Shatz in their published article *An inverse engineering perspective on nonimaging optical design*, Proc. SPIE, v. 2538, pp. 136-156 (1995), which article is incorporated herein by reference. This approach has been implemented in the NonImaging Concentrator Synthesis (NICOS) code, a software tool developed at Science Applications International Corporation (SAIC). The NICOS software is a high-fidelity, high-speed ray tracing code that computes radiometric and/or photometric quantities of interest for optical systems consisting of extended sources and combinations of reflective and/or refractive optical components. In its global-optimization mode, NICOS performs a search in which the shapes and relative orientations of one or more optical components are systematically varied within some multidimensional space of parameters until optimality of a user-specified radiometric or photometric performance measure is achieved.

The NICOS software was set up to maximize the flux within a 6° acceptance angle for producing the desired light beam having concentrated and divergent components within the combined beam resulting in a high intensity core beam surrounded by a smoothly transitioning lower intensity surround beam. Such computer maximization was conducted using the Dynamic Synthesis global optimization software subject to various constraints imposed upon the lens design, including flux distribution of the LED source, physical properties of the lens material, the diameter of the lens exit aperture or front surface 34, and the diameter of the lens entrance aperture or first rear surface 36.

Figure 3:
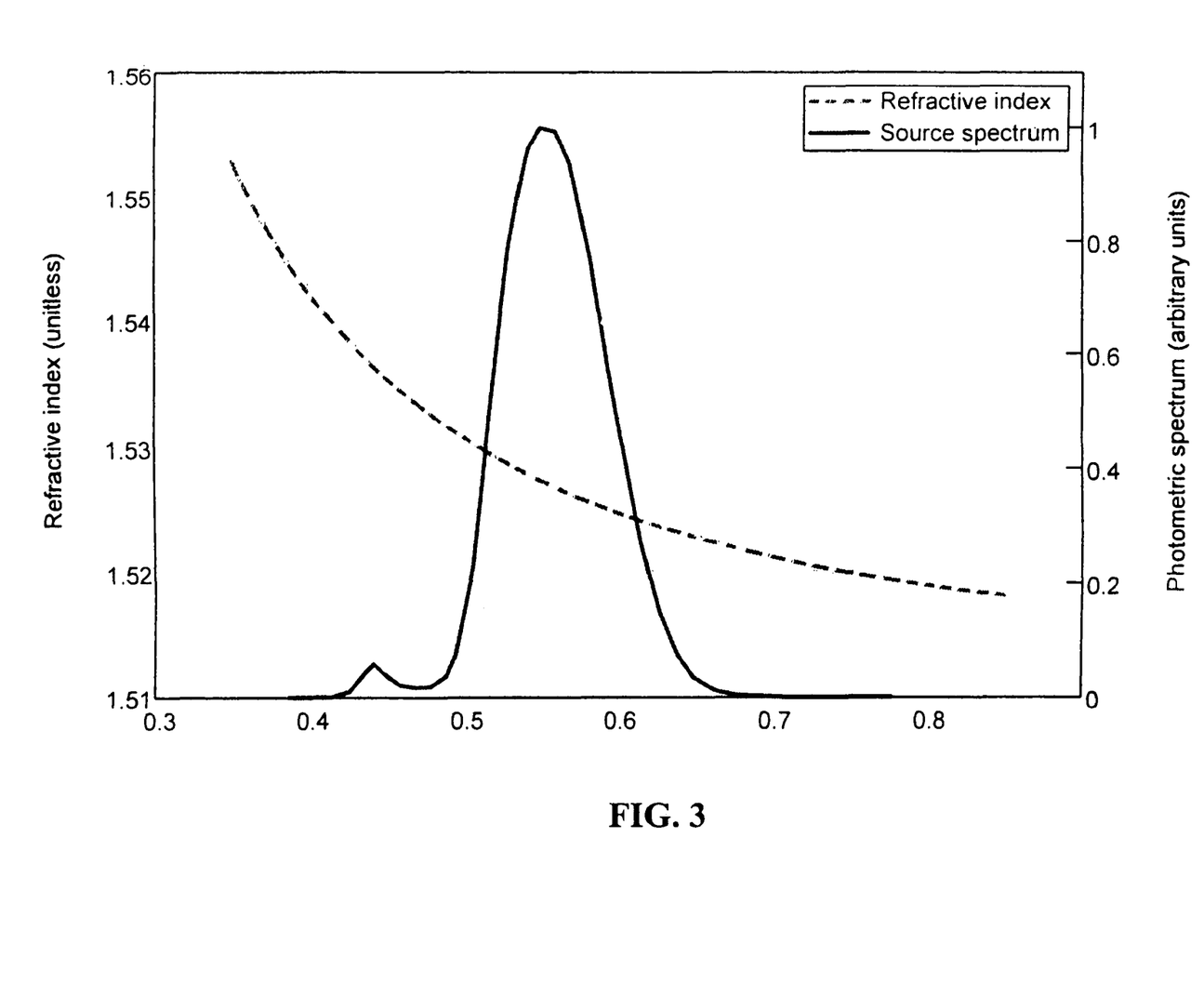
FIG. 3 is a graph depicting the assumed photometric source spectrum of the LED light source used in optimizing and analyzing the lens design of FIG. 2, together with the refractive index of the lens material as a function of wavelength.

The LED light source 18 employed was a Model F50280-SF hybrid LED source manufactured by Seoul Semiconductor Co., Ltd. (of Seoul, Korea), including a white-light die and an infrared (IR) die that were separately operable. The white-light die was used in optimizing and analyzing the lens design, with the white-light die centered on the lens optical axis a and the photometric source spectrum of which is depicted in FIG. 3. The assumed total lumen output of the white-light LED source was 127.54 lumens, which is the value of the measured flux output for this source. Each of the dies of the LED 19 was of typical square configuration.

The material utilized for the lens 24 was a transparent optical plastic manufactured by ZEON Corporation (of Tokyo, Japan) and marketed under the ZEONEX registered trademark. The refractive index of the ZEONEX plastic lens material as a function of wavelength is shown in FIG. 3.

The diameter of the lens exit aperture (the flat front surface 34) was selected as 20.0000 millimeters in the preferred example. The diameter of the lens entrance aperture (the flat first rear surface 36) was selected as 3.9958 millimeters, for allocating light from the LED light source such that approximately one-third of the light is received by the first rear surface 36 and approximately two-thirds of the light is received by the second rear surface 38.

The iterative search of the global-optimization process modifies the variable parameters for maximizing the flux within the specified acceptance angle. In particular, modifications were made to the distance along the optical axis a of the lens exit aperture (the flat front surface 34) to the lens entrance aperture (the flat first rear surface 36), the distance of the light source 18 (measured, for example, from the front plane of the LED die 19) to the lens first rear surface 36, and the axisymmetric shapes of the lens second rear surface 38 and the lens TIR side surface 40, while light ray traces were generated for simulating the light beams that would result from the various combinations searched.

Figure 4:
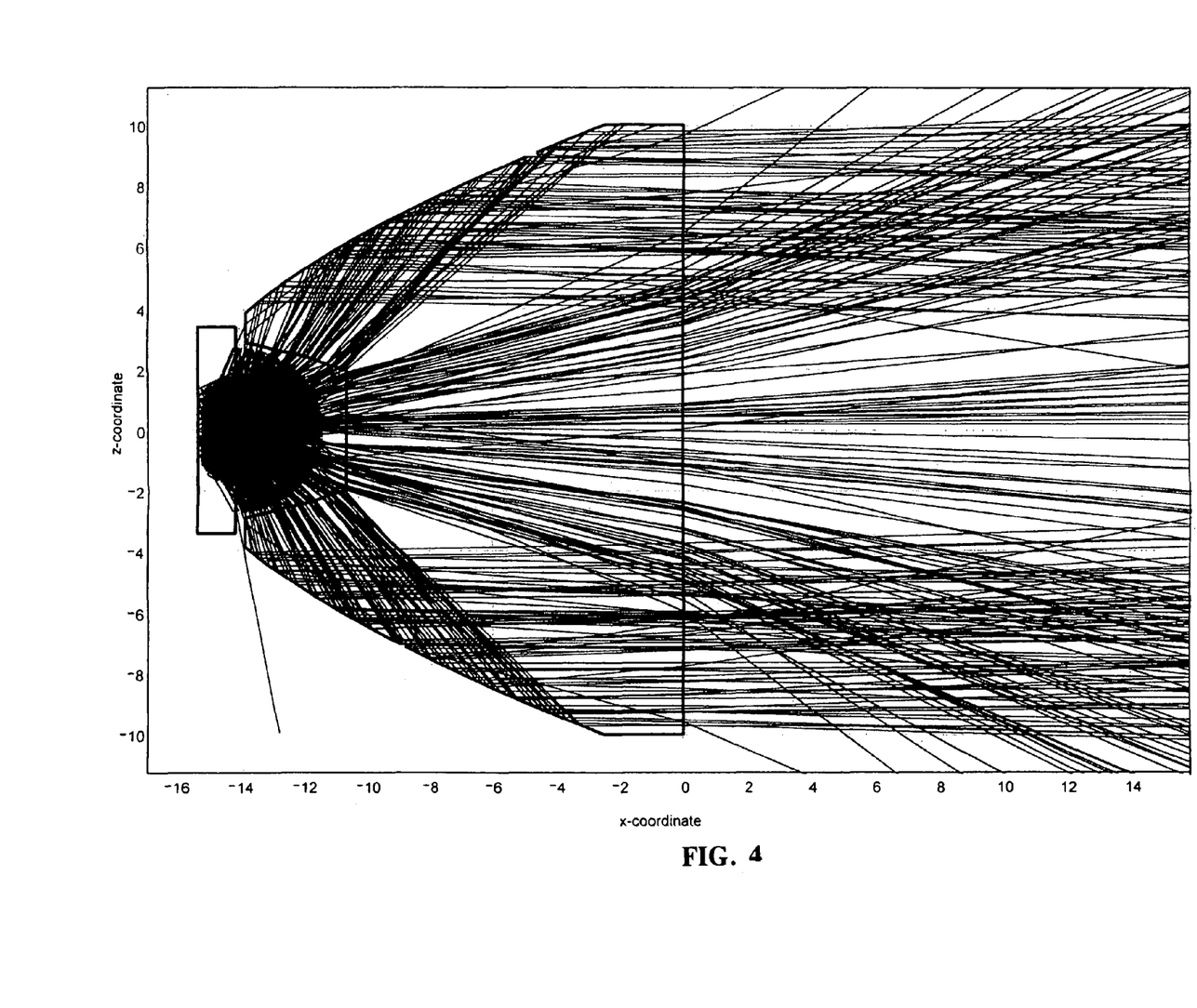
FIG. 4 depicts a computer simulated ray trace describing the light beam for the optimized lens shape and a white-light source of FIG. 2.

The computer simulated light ray trace for the resulting optimized lens shape is shown in FIG. 4. It is noted that the diameter of the entrance aperture (flat first rear surface 36) and its distance from the light source 18 determine the percentage of the light emitted from the source for producing the divergent light component (as shown in FIG. 4) and which is responsible for the surround beam, while the light rays which pass through the second rear surface 38 are total-internally reflected and substantially collimated (as shown in FIG. 4) by the TIR side surface 40 for producing the concentrated substantially collimated light component of the beam exiting from the lens front surface 34.

Figure 5:
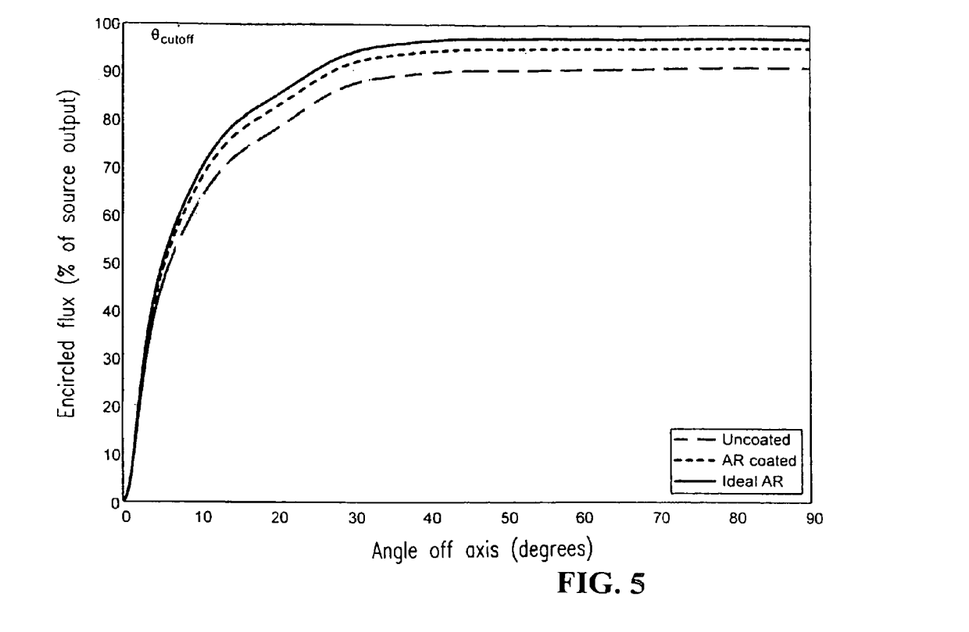
FIG. 5 shows a computer simulated analysis of normalized encircled flux versus angle for the light beam of FIG. 4.

FIG. 5 is a computer simulated plot of the encircled flux (as a percentage of source output using the white-light die) versus beam half angle, for the optimized lens uncoated and adjusted for an antireflective (AR) coating and with an ideal AR coating.

Figure 6:
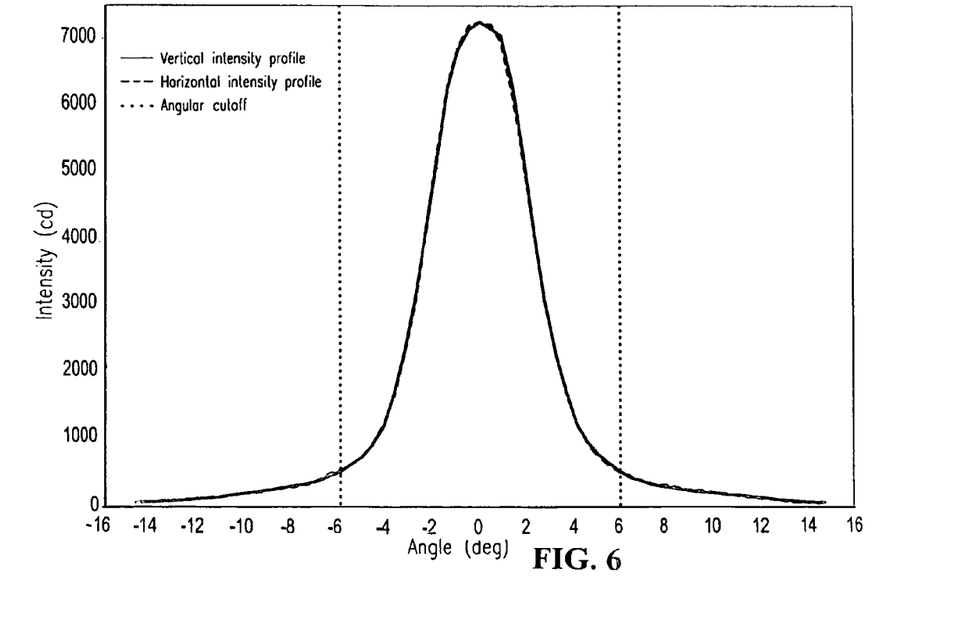
FIG. 6 shows a computer simulated analysis of the vertical and horizontal intensity profiles of the light beam of FIG. 4.
Figure 7:
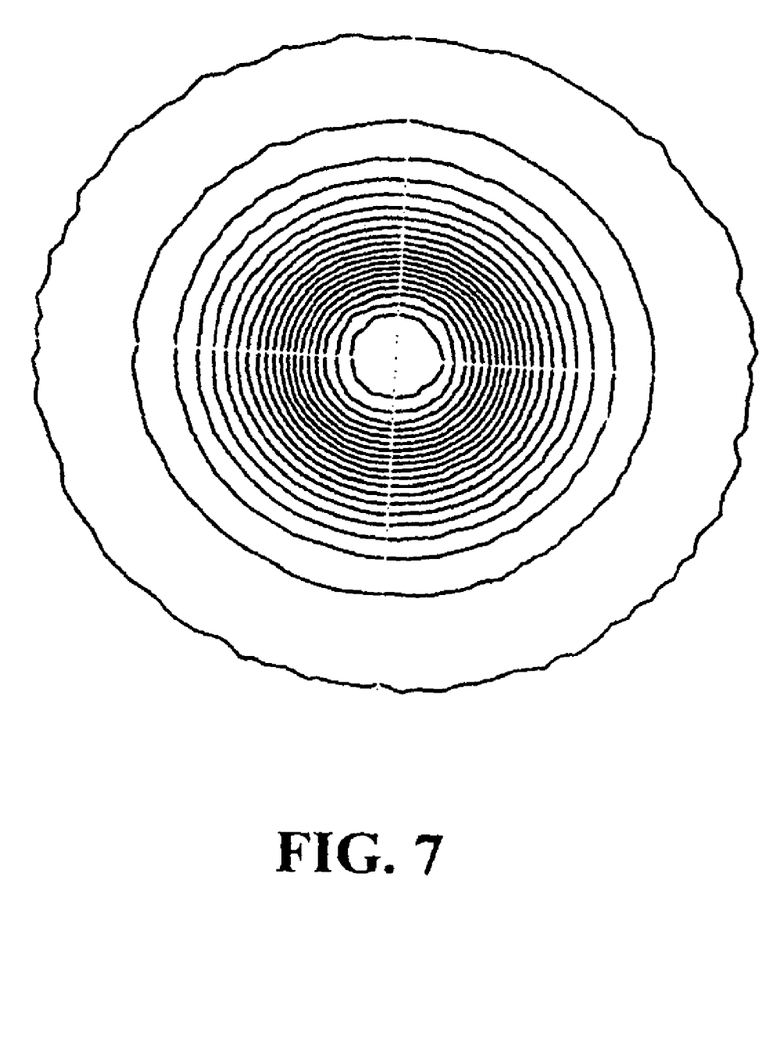
FIG. 7 is a computer simulated contour map showing the angular intensity distribution of the light beam of FIG. 4.

FIG. 6 is a computer simulated plot of intensity (in candelas) of the composite light beam produced by the ideal-AR-coated optimized lens 24 with the white-light die of the indicated light source 18 as a function of angle (in degrees). The related angular intensity distribution contour map of FIG. 7 is representative of an important feature of the optimized lens shape of the present invention, specifically the substantially circular spatial cross-section of the composite beam produced by the optimized lens from the substantially square LED die. The lens of the present invention effectively modifies the source light pattern so that the output beam is of substantially circular cross-section.

The axisymmetric profile of the lens 24 is described by sample points defined by the list of x,y-coordinate pairs set forth in FIGS. 8a and 8b. The x-coordinate represents position along the optical axis in the global coordinate system of the lens surface referenced from the front surface 34, and the y-coordinate (as does the z-coordinate noted in FIG. 2) represents radial position referenced from (i.e. distance away from) the optical axis. The global x-axis corresponds to the symmetry axis of the lens, and the sample points on the profile of the lens preferred embodiment is in millimeters with a sampling interval of 0.10 millimeters. The lens profile of the preferred embodiment provides for a flange section 27 of approximately 2.5 millimeters immediately rearwardly of the front surface 34 (located at x=0.0000) connecting the aspheric TIR section of the lens to flat surface 34, although a flange section 27 substantially greater or less than the noted 2.5 millimeters is possible; for example, a flange section thickness of up to approximately 4.0 millimeters may be used with negligible effect on performance. The optimum placement of the LED 19 is at x=−14.1280 millimeters, or 3.4654 millimeters (i.e. approximately 3.5 millimeters) rearwardly of the first rear surface 36. With respect to the lens profile, intermediate points between any two sample points listed may be determined using a cubic spline.

As may be appreciated from FIGS. 8a and 8b, the first rear surface 36 of the lens 24 comprises a circular planar surface of (in the preferred lens embodiment where the x-coordinate and the y-coordinate are dimensioned in millimeters) radius 1.9979 millimeters rotationally symmetric about the x axis, and situated at x=−10.6626 millimeters (including the approximate 2.5 millimeter flange section). The lens front surface 34 comprises a circular planar surface of radius 10.0000 millimeters (in the preferred embodiment) rotationally symmetric about the x axis, and situated at x=0.0000. The lens second rear surface 38 and TIR side surface 40 are each rotationally symmetric about the x-axis.

Figure 9:
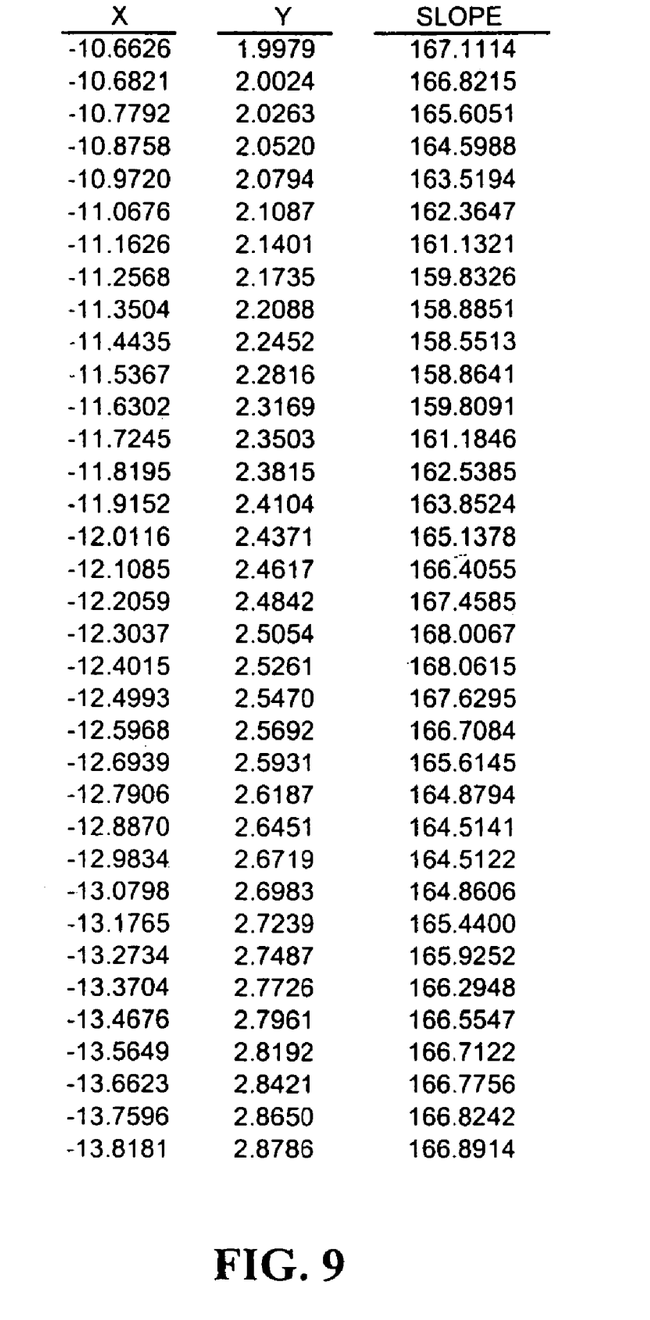
FIG. 9 comprises a list of sample points describing the aspheric refractive rear surface about the light source, for the lens shown in FIG. 2.

The list of the x,y-coordinate pairs of sample points in FIG. 9 is specific to the profile of the aspheric refractive second rear surface 38 of the optimized lens 24, in millimeters for the preferred embodiment and providing for a 2.5 mm flange section 27, and further lists the slope angles (in degrees) representing the angle of the tangent to the surface at each point, measured counterclockwise with respect to the x-axis in the global coordinate system.

The list of x,y-coordinate pairs of sample points in FIG. 10 is specific to the aspheric TIR side surface 40 of the lens 24, in millimeters in the preferred embodiment and providing for a 2.5 mm flange section 27, further listing the slope angles (in degrees) at each point.

As discussed above, the shape of the lens 24 was optimized for use with the white-light die 19 of the identified LED light source 18. In addition to the analysis of the resulting lens design using the white-light die described above, the resulting lens design was analyzed using the IR die of the identified light source 18 with the IR die replacing the white-light die and centered on the lens optical axis a.

An IR-intensity normalization was used to generate an estimate of the IR-intensity output produced by the lens 24 when used with the IR die of the indicated source 18. The IR-intensity normalization assumed the IR flux output by the source to be in watts of IR radiation, and that the total flux output was 314.8 mW (corresponding to the measured output of the IR die). The computer simulated ray trace through the lens 24 used the refractive index of the ZEONEX plastic lens material corresponding to a wavelength of 850 nm.

Figure 11:
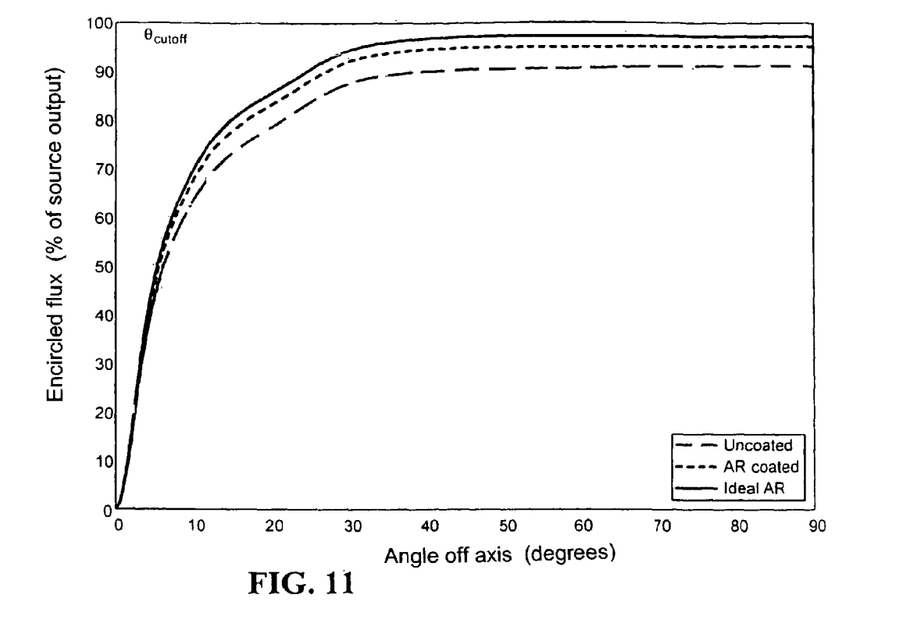
FIG. 11 shows a computer simulated analysis of normalized encircled flux versus angle for a light beam produced by the lens of FIG. 2 using an alternative infrared light source.

A computer simulated plot of the encircled flux (as a percentage of source output using the IR die) versus beam half angle is shown in FIG. 11, for the white-light-die-optimized lens 24 uncoated and adjusted for an antireflective (AR) coating and with an ideal AR coating.

Figure 12:
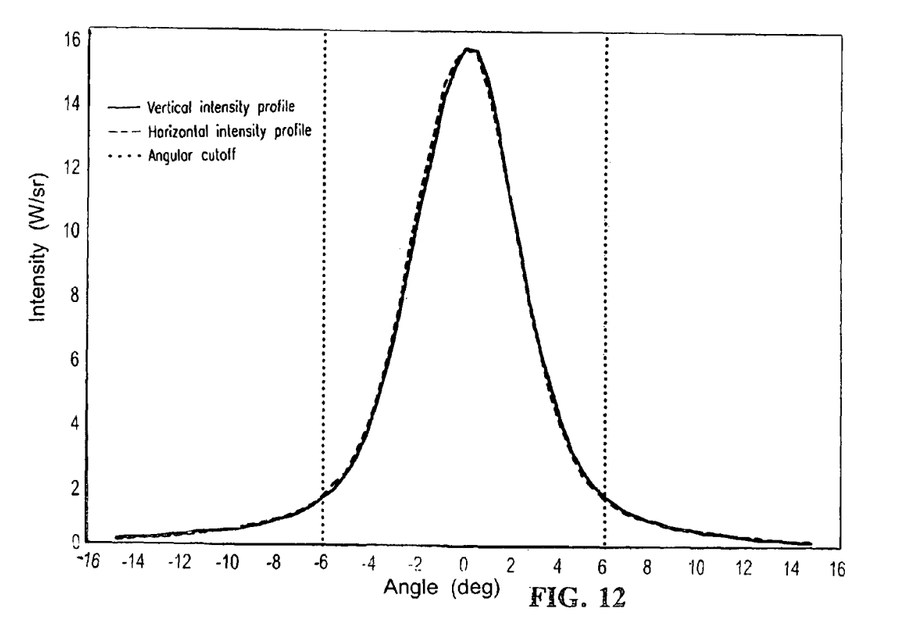
FIG. 12 shows a computer simulated analysis of the vertical and horizontal intensity profiles of the light beam referred to in FIG. 11.

FIG. 12 is a computer simulated plot of intensity (in candelas) of the composite IR light beam produced by the ideal-AR-coated optimized lens 24 with the IR die of the indicated light source 18 as a function of angle (in degrees). The related angular intensity distribution contour map of FIG. 13 is representative of the substantially circular spatial cross-section of the composite IR beam produced by the white-light die optimized lens 24 from the approximately square IR die of the indicated LED source.

Figure 13:
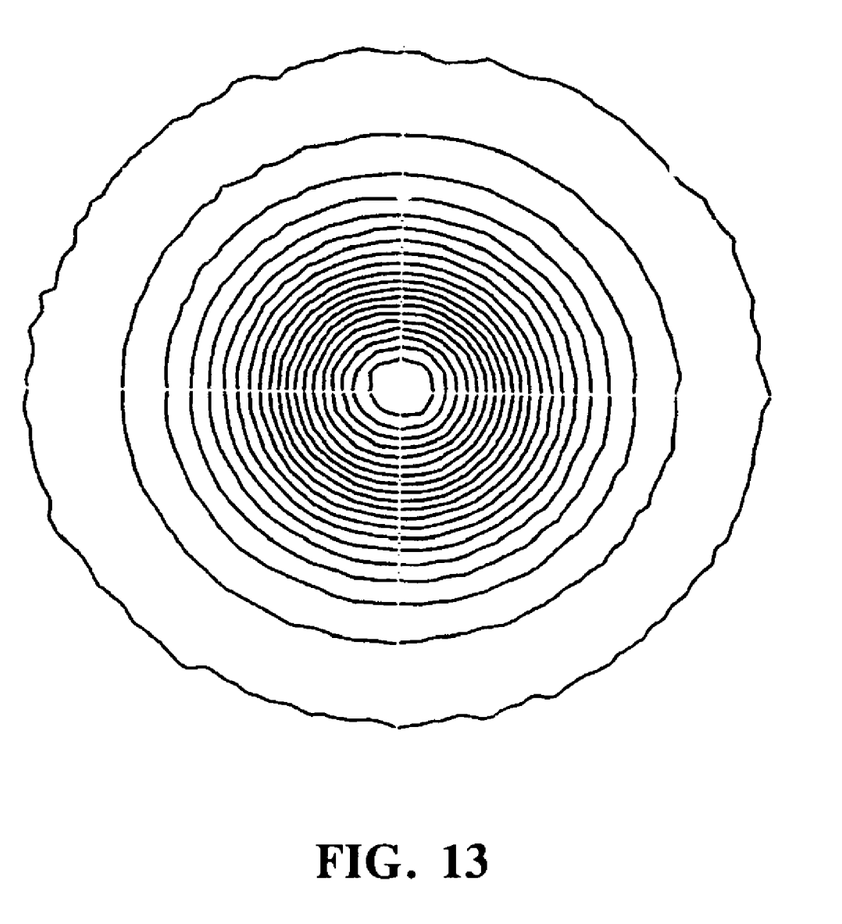
FIG. 13 is a computer simulated contour map showing the angular intensity distribution of the light beam referred to in FIG. 11.

The analysis represented in FIGS. 11-13 indicates that the IR die of the indicated light source may be used with the lens 24 (which was optimized for the white-light die) for producing a satisfactory—although not optimal—IR beam having concentrated and divergent components.

Thus, there has been described a preferred embodiment of a nonimaging light assembly having a light source and a lens symmetrical about an optical axis for receiving light from the light source and producing therefrom a composite light beam having a concentrated component and a divergent component resulting in a high intensity core beam surrounded by a smoothly transitioning lower intensity surround beam. In a preferred embodiment wherein the light source comprises an approximately square light emitting diode, the resulting combined light beam is of substantially circular cross-section. Further, in a preferred embodiment including a hybrid LED light source having a white-light die and an IR die, a lens optimized with the white-light die would produce a satisfactory IR beam having concentrated and divergent components when used with the IR die. Other embodiments of the present invention, and variations of the embodiment described herein, may be developed without departing from the essential characteristics thereof.

We claim:
1. A nonimaging light assembly, comprising:
a light source; and
a lens symmetrical about an optical axis, including
 a first rear surface intersecting said optical axis for receiving a first portion of light emanating from said light source positioned along said optical axis,
 a second rear surface extending about said first rear surface for receiving a second portion of light emanating from said light source, a side surface for total-internally reflecting and substantially collimating light received by said second rear surface, and a front surface for exiting light reflected from said side surface and light received by said first rear surface;

said lens having an axisymmetric profile substantially described by sample points thereon defined by x,y-coordinate pairs set forth in FIGS. 8*a* and 8*b*, incorporated herein by reference, where x represents position along an x-coordinate along said optical axis referenced from said front surface and y represents position along a y-coordinate radially from said optical axis, for exiting at said front surface a composite light beam comprising a first light component diverging from said optical axis produced from light received by said first rear surface combined with a concentrated substantially collimated second light component resulting in a core beam surrounded by a smoothly transitioning lower intensity surround beam.

2. The light assembly according to claim 1, wherein:
the distance between said light source and said first rear surface is selected for allocating to said first rear surface approximately one-third of the light received by said lens from said light source.

3. The light assembly according to claim 1, wherein:
said light source comprises a light emitting diode; and
said composite light beam exiting said front surface has a substantially circular cross-section.

4. The light assembly according to claim 1, wherein:
said light source has an approximately square configuration substantially perpendicular to said optical axis; and
said composite light beam exiting said front surface has a substantially circular cross-section.

5. The light assembly according to claim 1, wherein:
said x-coordinate and said y-coordinate are dimensioned in millimeters.

6. The light assembly according to claim 5, wherein:
the distance between said light source and said first rear surface is approximately 3.5 millimeters.

7. The light assembly according to claim 1, wherein:
said light source comprises a hybrid light emitting diode source including a first die and a second die, said axisymmetric profile of said lens optimized for use with said first die positioned on said optical axis, said light source adapted for replacing said first die with said second die on said optical axis.

8. The light assembly according to claim 7, wherein:
said first die is a white-light die.

9. The light assembly according to claim 8, wherein:
said second die is an infrared die.

10. A nonimaging light assembly, comprising:
a light source; and
a lens symmetrical about an optical axis, including
a substantially circular first rear surface intersecting said optical axis for receiving a first portion of light emanating from said light source positioned along said optical axis,
a second rear surface extending about said first rear surface for receiving a second portion of light emanating from said light source, said second rear surface having an axisymmetric profile substantially described by sample points thereon defined by x,y-coordinate pairs set forth in FIG. 9, incorporated herein by reference, where x represents position along an x-coordinate along said optical axis referenced from a substantially flat front surface and y represents position along a y-coordinate radially from said optical axis,
a side surface having an axisymmetric profile for total-internally reflecting and substantially collimating light received by said second rear surface, and
said substantially flat front surface for exiting light reflected from said side surface and light received by said first rear surface;
the diameter of said first rear surface, said axisymmetric profile of said second rear surface, and said axisymmetric profile of said side surface being related for exiting at said front surface a composite light beam comprising a first light component diverging from said optical axis produced from light received by said first rear surface combined with a concentrated substantially collimated second light component resulting in a core beam surrounded by a smoothly transitioning lower intensity surround beam.

11. The light assembly according to claim 10, wherein:
said diameter of said first rear surface is selected for receiving approximately one-third of the light received by said lens from said light source.

12. The light assembly according to claim 10, wherein:
said light source comprises a hybrid light emitting diode source including a first die and a second die, said lens optimized for use with said first die positioned on said optical axis, said light source adapted for replacing said first die with said second die on said optical axis.

13. The light assembly according to claim 12, wherein:
said first die is a white-light die.

14. The light assembly according to claim 13, wherein:
said second die is an infrared die.

15. The light assembly according to claim 10, wherein:
said first rear surface comprises a refractive surface substantially perpendicular to said optical axis;
said front surface comprises a refractive surface substantially perpendicular to said optical axis;
said second rear surface comprises an aspheric refractive surface; and
said side surface comprises an aspheric total-internal reflective surface, said axisymmetric profile of said side surface substantially described by sample points thereon defined by x,y-coordinate pairs set forth in FIG. 10, incorporated herein by reference, where x represents position along an x-coordinate along said optical axis referenced from said front surface and y represents position along a y-coordinate radially from said optical axis.

16. The light assembly according to claim 15, wherein:
said x-coordinate and said y-coordinate are dimensioned in millimeters.

17. The light assembly according to claim 15, wherein:
said first rear surface is substantially flat.

18. A nonimaging light assembly, comprising:
a light source; and
a lens symmetrical about an optical axis, including
a substantially circular first rear surface intersecting said optical axis for receiving a first portion of light emanating from said light source positioned along said optical axis,
a second rear surface extending about said first rear surface and having an axisymmetric profile for receiving a second portion of light emanating from said light source,
a side surface for total-internally reflecting and substantially collimating light received by said second rear surface, said side surface having an axisymmetric profile substantially described by sample points thereon defined by x,y-coordinate pairs set forth in FIG. 10, incorporated herein by reference, where x represents position along an x-coordinate along said optical axis referenced from a substantially flat front surface and y represents position along a y-coordinate radially from said optical axis, said substantially flat front surface for exiting light reflected from said side surface and light received by said first rear surface;

the diameter of said first rear surface, said axisymmetric profile of said second rear surface, and said axisymmetric profile of said side surface being related for exiting at said front surface a composite light beam comprising a first light component diverging from said optical axis produced from light received by said first rear surface combined with a concentrated substantially collimated second light component resulting in a core beam surrounded by a smoothly transitioning lower intensity surround beam.

19. The light assembly according to claim 18, wherein:
said diameter of said first rear surface is selected for receiving approximately one-third of the light received by said lens from said light source.

20. The light assembly according to claim 18, wherein:
said x-coordinate and said y-coordinate are dimensioned in millimeters.

21. The light assembly according to claim 18, wherein:
said light source comprises a hybrid light emitting diode source including a first die and a second die, said lens optimized for use with said first die positioned on said optical axis, said light source adapted for replacing said first die with said second die on said optical axis.

22. The light assembly according to claim 18, wherein:
said first die is a white-light die.

23. The light assembly according to claim 22, wherein:
said second die is an infrared die.

\* \* \* \* \*